(12) United States Patent
Anderson et al.

(10) Patent No.: US 11,315,012 B2
(45) Date of Patent: Apr. 26, 2022

(54) NEURAL NETWORK TRAINING USING GENERATED RANDOM UNIT VECTOR

(71) Applicant: Intel Corporation, Santa Clara, CA (US)

(72) Inventors: Timothy Isaac Anderson, Fresno, CA (US); Monica Lucia Martinez-Canales, Los Altos, CA (US); Vinod Sharma, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 1129 days.

(21) Appl. No.: 15/869,987

(22) Filed: Jan. 12, 2018

(65) Prior Publication Data
US 2019/0050727 A1 Feb. 14, 2019

(51) Int. Cl.
G06N 3/08 (2006.01)

(52) U.S. Cl.
CPC ..................... *G06N 3/08* (2013.01)

(58) Field of Classification Search
CPC ........... G06N 3/08; G06N 3/084; G06N 20/00
See application file for complete search history.

(56) References Cited

U.S. PATENT DOCUMENTS

| | | | |
|---|---|---|---|
| 6,618,713 B1 * | 9/2003 | Woodall | G06N 3/08 706/15 |
| 2006/0132128 A1 * | 6/2006 | Freedman | G01V 3/28 324/303 |
| 2015/0205896 A1 * | 7/2015 | Tanaka | G06F 30/23 703/2 |
| 2019/0171949 A1 * | 6/2019 | Chiang | G06N 5/04 |

FOREIGN PATENT DOCUMENTS

CN 103294929 B * 10/2016

OTHER PUBLICATIONS

Sun Shi-ping, Translation of CN1032949Self-adaptive direct search simulated annealing algorithm, 2016, [retrived on Dec. 18, 2018 ] retrived from: https://worldwide.espacenet.com/patent/search/family/049095780/publication/CN103294929A?q=Self-adaptive%20direct%20search%20simulated%20annealing%20algorithm.*
Author: Atilim Gunes Baydin, Title: "Automatic Differentiation in Machine Learning: a Survey", Date: (Aug. 17, 2017), Pertinent pp. 3-21.*
Author: D. Leventhal, Title: "Randomized Hessian Estimation and Directional Search", Date (Sep. 24, 2008), Pertinent pp. 13-14.*

* cited by examiner

*Primary Examiner* — Li B. Zhen
*Assistant Examiner* — Henry Nguyen
(74) *Attorney, Agent, or Firm* — Schwegman Lundberg & Woessner, P.A.

(57) ABSTRACT

Systems and techniques for neural network training are described herein, a training set may be received for a neural network. Here, the neural network may comprise a set of nodes arranged in layers and a set of inter-node weights between nodes in the set of nodes. The neural network may then be iteratively trained to create a trained neural network. An iteration of the training may include generating a random unit vector and creating an update vector by calculating a magnitude for the random unit vector based on a degree that the random unit vector matches a gradient—where the gradient is represented by a dual number. The iteration may continue by updating a parameter vector for an inter-node weight by subtracting the update vector from a previous parameter vector of the inter-node weight. The trained neural network may then be used to classify data.

24 Claims, 7 Drawing Sheets

NEURAL NETWORK TRAINING USING GENERATED RANDOM UNIT VECTOR

TECHNICAL FIELD

Embodiments described herein generally relate to artificial neural networks and more specifically to neural network training.

BACKGROUND

Artificial intelligence (AI) is a field concerned with developing decision making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights—ANN design, such as a number of neuron layers, or specific connections between layers including circular connections, are also design considerations; however, determining correct synapse weights is common to nearly all ANNs. The training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

The gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. In some implementations, variable step sizes are attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
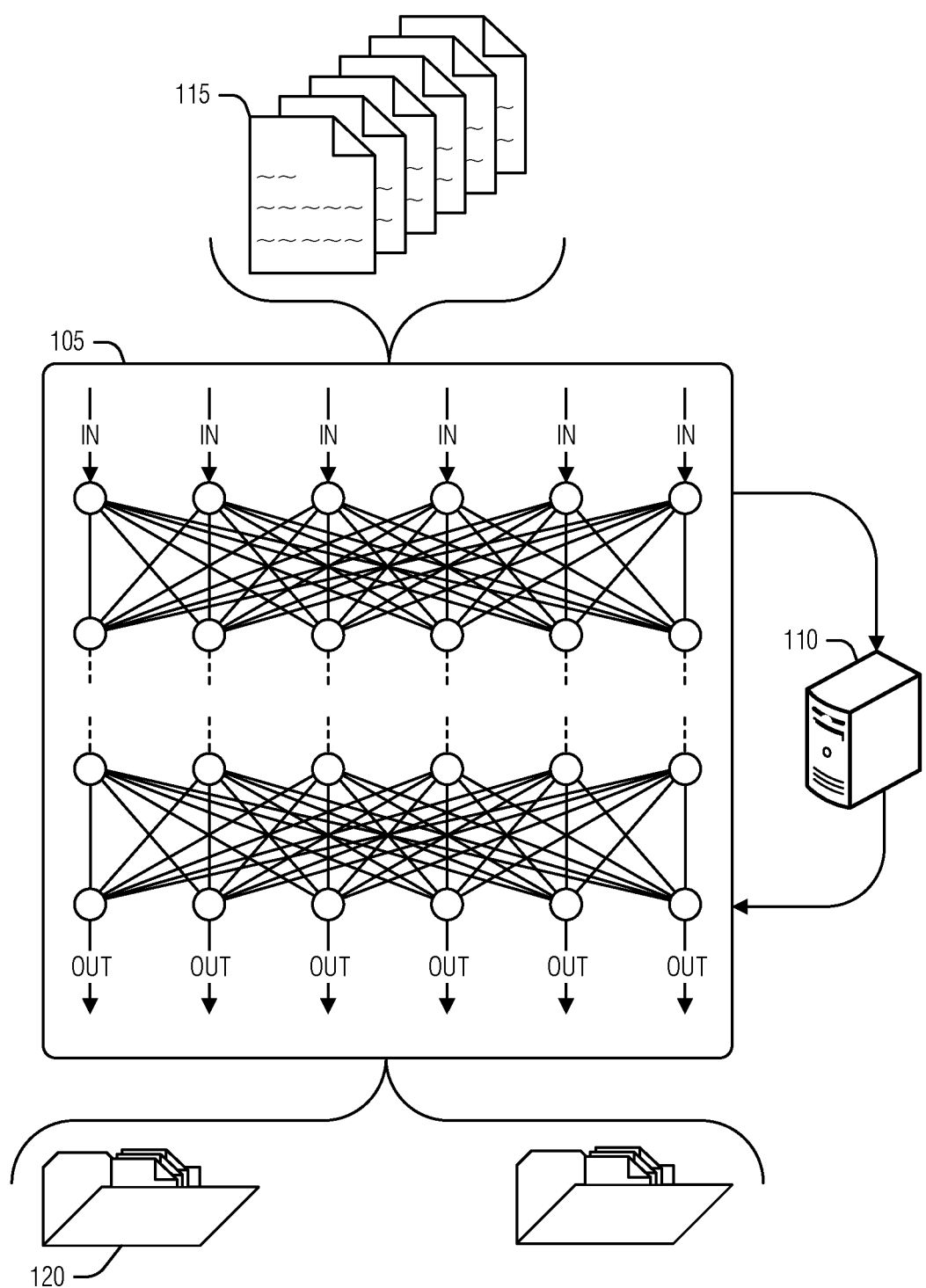
FIG. 1 is a block diagram of an example of an environment including a system for neural network training, according to an embodiment.

Despite the popularity enjoyed by backpropagation in training ANNs, using backpropagation is still slow—e.g., due to the backward locking required to merge all paths originating at a node, sensitive to initial conditions—and due to awkward weight initialization to accelerate, or even achieve, convergence, and difficult to scale—and due to high cost of communicating gradient updates across tens of millions of parameters in the network. Thus, several approaches have been tried to improve ANN training performance.

Nearly all research to optimize ANN training has focused on using fewer iterations during the training rather than trying to avoid using backpropagation. In current deep learning literature, optimization is dominated by two main variants of stochastic gradient descent: the adaptive gradient algorithm (AdaGrad) and Adaptive Moment Estimation (Adam). Adam has found widespread use in the machine learning community because it combines an adaptive step size with momentum terms that have been shown to be reasonably robust to saddle points. As stochastic gradient descent variants, these techniques exhibit linear convergence, which means that the error decreases proportionally to the inverse of the number of training iterations.

Other optimization techniques have been applied to ANNs with some success. Examples include Newton's method, conjugate gradient method, Hessian-free Optimization, and Kronecker-factored Approximate Curvature. These techniques exhibit super linear convergence at the cost of high computational costs to perform a line search over a step direction, high memory load to store an exact or approximate Hessian matrix, or both. Alternating direction method of multipliers (ADMM) and synthetic gradients, are techniques to eliminate backpropagation, although they have not been widely employed for a variety of reasons.

Problems with the existing ANN training techniques noted above are numerous. For example, the time to train an ANN may be excessive. When training an ANN, all training examples are passed forward through the layers of the network (known as forward locking) and then backwards through the network (known as backward locking) before the parameter values may be updated. For smaller models (e.g., with few neuron layers), the forward and backward locking are not an issue. However, for ANNs with many tens to hundreds of inner layers—such as those used in many current deep learning models used for autonomous driving—the backward locking may add significant computational overhead depending on the scale of hardware (e.g., number or speed of processors, system memory size and speed, inter-component communication speed, etc.), adversely increasing the time to train ANNs.

The techniques to avoid backpropagation do not improve the time to train issue. ADMM may be used to optimize the ANN, avoiding backpropagation, but does not significantly outperform stochastic gradient descent. Synthetic gradients have also been used to train ANNs. However, the synthetic gradients themselves are generated by small helper networks placed at every layer of the large ANN to generate an estimated gradient based on the input data. When training purely with the synthetic gradients, this ANN avoids backward locking. However, the synthetic gradient generator networks require backpropagation in order to train themselves. Because this method does not fully avoid backward locking, the time to train issue remains.

Another issue is robust weight initialization. ANN presents optimization problems on a highly non-convex surface. Therefore, the model, represented by the ANN, should be initialized near a desired minima (e.g., the result of optimizing the objective function), requiring a-priori knowledge of the desired minima. Poor weight initialization may cause the ANN to converge to a saddle point, or local minimum, with a sub-optimal objective function value. Further, initializing weights to values that are too small may cause an ANN to train slowly or poorly, and initializing weights to values that are too large may lead to numerical instabilities. For these reasons, training techniques should be robust to all initial weight values. However, backpropagation is limited because weights must be initialized to non-zero values. Because no robust weight selection strategy has achieved consensus as to its efficacy, a common practice, across nearly all ANN implementations, is to initialize weights to be small random values.

Another issue with current techniques involves model parallelism. With conventional backpropagation techniques, it is difficult to distribute the ANN across multiple compute nodes (e.g., processing hardware separated by a communications network such as a bus, or conventional wired or wireless network) due to high communication costs. The communication cost (e.g., shuffle size) for backpropagation is proportional to the product of the number of processing elements over which to distribute the ANN and the number of parameters in the ANN model. This value may be on the order of tens of millions of parameters in large neural networks. Of the various ANN training techniques, ADMM is parallelizable and has been empirically demonstrated to scale linearly with the number of compute nodes (e.g., processors). However, most ANN training techniques have to be customized for model parallelism and thus do not generally scale efficiently.

Another issue with current techniques include poor memory caching and storage performance. Generally, there is a tradeoff between speed or robustness and memory use. Adam has been shown to be more robust to saddle points and local minima than other techniques, but Adam also requires storage of multiple momentum terms for each model parameter, a significant increase in memory use over those other techniques. Similarly, Newton or quasi-Newton techniques have significantly faster convergence than stochastic gradient descent algorithms, but Newton techniques require a large number of forward evaluations and storage of many parameters (e.g., usually as some form of the Hessian matrix) to operate on today's computer architectures. Even techniques with minimal memory requirements, such as the nonlinear conjugate gradient method, require a large number of forward evaluations of the model (e.g., in some form of line search) and, in practice, are demonstrated to train ANNs in approximately the same amount of time as conventional stochastic gradient descent methods.

Another issue with ANN training techniques involves training data size. Backpropagation of gradients accounts for a large proportion of the computational load associated with training ANNs. This computational load limits a processing node's ability to process larger amounts of training data. As a result, training the ANN to reach higher accuracy on the entire data set often requires laborious data transfers of small batches of training data sets.

To address the numerous problems noted above with respect to ANN training techniques, optimization may be accomplished without backpropagation and without excessive parameter storage or communication by modifying the stochastic gradient descent (SGD) technique by randomly generating a unit parameter vector and adjusting the magnitude of that parameter vector by its degree of coincidence to an estimated gradient. Dual numbers, and Hyper-dual numbers may be used to measure the parameter vector and estimated gradient coincidence, enabling an elegant and compact representation, minimizing inter-processing node communications. Thus, the optimization technique is capable of training a neural network without backpropagation, providing an alternative mechanism that is robust, scalable, and executable on multiple computer architectures.

Advantages of the presented techniques over previous ANN training techniques are numerous. For example, generating a random perturbation for every parameter (e.g., the unit parameter vector) and then using dual or hyper-dual number arithmetic to calculate the optimal step size to take in the direction of the perturbation, results in independent operations that avoid backward locking. That is, because the perturbations and updates are chosen independently, backward locking is not used between ANN layer updates, and thus all parameter updates may be done in parallel.

Another advantage includes an ability to train an ANN using weights initialized to much smaller values than is possible with backpropagation. Further, the random perturbations may be generated separately on each processing element with only the seed for the random number generation communicated between processing nodes. Thus, the communication cost (e.g., shuffle size) is reduced from other techniques to the order of the number of processing elements.

Additionally, because some examples are based on dual number and hyper-dual number arithmetic with its nilpotent properties, the only substantial storage overhead is on the data structure itself for the dual or hyper-dual number, which often fits into the vector extension bit registers of many central processing units (CPUs). Further, because the techniques are highly parallelizable with low communication overhead, the training set size constraints are not limited by the processing capabilities of processing nodes, but rather by available storage for the training set.

By eliminating backpropagation, computational overhead associated with backward-locking is eliminated, thereby increasing the computational efficiency of deep learning on a large variety of computer architectures. Moreover, by reducing the processing requirements of any given processing nodes, specialty hardware, such as graphics processing units (GPUs) are not required to efficiently train ANNs, as is often necessary with other deep learning training methods. In fact, this distributed technique is readily applicable to distributed computing platforms in the data center or decentralized computing platforms at the network edge. In fact, because the ANN parameters may be initialized to near-zero values without hampering time to train, training may even be carried out by mobile devices, or other resource-limited devices. This last arrangement is made more attractive due to the comparatively low inter-node communication overhead, making it feasible to train a complex ANN by harnessing the distributed computing capabilities of a network of mobile devices.

Although the examples are provided in the context of ANN training, these techniques are applicable to a variety of optimization problems associated with logistics, routing, tracking, fleet management, and other operations research approaches in which a cost function or loss function is minimized. Additional details and examples are described below.

FIG. 1 is a block diagram of an example of an environment including a system for neural network training, according to an embodiment. The system includes an ANN 105 that is trained using a processing node 110. The processing node 110 may be a CPU, GPU, field programmable gate array (FPGA), digital signal processor (DSP), application specific integrated circuit (ASIC), or other processing circuitry. In an example, multiple processing nodes may be employed to train different layers of the ANN 105, or even different nodes within layers. Thus, a set of processing nodes is arranged to perform the training of the ANN 105.

The set of processing nodes is arranged to receive a training set 115 for the ANN 105. The ANN 105 comprises a set of nodes arranged in layers and a set of inter-node weights (e.g., parameters) between nodes in the set of nodes. In an example, the training set 115 is a subset of a complete training set. Here, the subset may enable processing nodes with limited storage resources to participate in training the ANN 105.

As noted above, the set of processing nodes is arranged to train the neural network to create a trained neural network. Once trained, data input into the ANN will produce valid classifications 120 (e.g., the input data will be assigned into categories), for example. The training performed by the set of processing nodes is iterative. In an example, each iteration of the training the neural network is performed independently between layers of the ANN 105. Thus, two distinct layers may be processed in parallel by different members of the set of processing nodes. In an example, different layers of the ANN 105 are trained on different hardware. Here, the members of different members of the set of processing nodes are in different packages, housings, computers, etc. In an example, each iteration of the training is performed independently between nodes in the set of nodes. This example is an additional parallelization whereby individual nodes (e.g., neurons) are trained independently. In an example, the nodes are trained on different hardware.

The set of processing nodes is arranged to, for each iteration, generate a random unit vector. Here, each parameter of the training is randomly perturbed, but the magnitude of the random vector is constant. In an example, to generate the random unit vector, the set of processing nodes is arranged to calculate $\vec{u} = \sim \mathcal{N}(0, h^2 I)$, where $\vec{u}$ is the random unit vector and $\mathcal{N}(0, h^2 I)$ is an n-dimensional random Gaussian vector with variance $h^2$. In an example, a seed used to generate the random unit vector is communicated to the different hardware when used to train either layers or nodes of the ANN 105.

For an iteration, the set of processing nodes are also arranged to create an update vector by calculating a magnitude for the random unit vector based on a degree that the random unit vector coincides with an estimated gradient between a member of the training set and an objective function for the neural network. Here, the gradient is represented by a dual number. As noted above, the dual number, with its nilpotent property, provides an efficient representation of the estimated gradient for communications and also simplifies the calculation to ascertain the coincidence between the random unit vector and the estimated gradient. In an example, to calculate the magnitude for the random unit vector, the set of processing nodes is arranged to calculate $$\alpha \leftarrow \frac{\text{Im}(f(\theta + \vec{u}\epsilon))}{|\vec{u}|^2},$$

where $\alpha$ is the magnitude, $\theta$ is the parameter vector, and $$\frac{\text{Im}(f(\theta + \vec{u}\epsilon))}{|\vec{u}|^2}$$

is the dual number representation of the estimated gradient. In an example, the dual number is a hyper-dual number. Here, to calculate the magnitude for the random unit vector, the set of processing nodes are arranged to calculate $$\alpha \leftarrow \frac{\text{Im}_1[f(\theta + \vec{u}\epsilon_1 + \vec{u}\epsilon_2)]}{\text{Im}_3[f(\theta + \vec{u}\epsilon_1 + \vec{u}\epsilon_2)]},$$

where α is the magnitude, θ is the parameter vector, and $$\frac{\text{Im}_1[f(\theta + \vec{u}\epsilon_1 + \vec{u}\epsilon_2)]}{\text{Im}_3[f(\theta + \vec{u}\epsilon_1 + \vec{u}\epsilon_2)]}$$

is the hyper-dual number representation of the estimated gradient, where $\text{Im}_1$ stands for taking the coefficient of the first imaginary component (the coefficient of $\epsilon_1$), and $\text{Im}_3$ stands for taking the coefficient of the third imaginary component (the coefficient of $\epsilon_1\epsilon_2$).

In an example, the estimated gradient is specific to the training set and different than a second estimated gradient for a different subset of the complete training set. This example illustrates the possible differences when gradients are specific to subsets of total training data. Thus, the gradient may be estimated from a single sample in a subset of training data and used while that subset is being trained. Then, upon a different subset, a new estimated gradient may be computed and used.

The set of processing nodes is also arranged to update a parameter vector for an inter-node weight by subtracting the update vector from a previous parameter vector of the inter-node weight. In an example, to update the parameter vector, the set of processing nodes are arranged to calculate $\theta_{new}=\theta_{last}-\alpha\vec{u}$, wherein $\theta_{new}$ is the updated parameter vector, and $\theta_{last}$ is the previous parameter vector. The acts of randomly perturbing the parameters, scaling the random perturbation by the gradient coincidence, and using that as the parameter update provides many of the benefits of the training technique. This technique recognizes that a number of parameter adjustments may not be optimal, yet still move the parameters in the right direction to optimize the objective function. Thus, in contrast to standard SGD, each iteration improves convergence, whereas SGD may discard many calculations that are not aligned to the estimated gradient.

In an example, the iterations include an analytical gradient iteration. Here, the analytical gradient iteration occurring every T iterations of the iterations. The iteration described above, with the random perturbation of parameters updating the parameters, is replaced with a complete (e.g., analytical) calculation of the gradient every so often (e.g., once every T times the training loops). This provides a corrective safeguard to the less determinative standard iteration. Although this analytical gradient iteration is computationally more expensive, dispersed throughout the training iterations, the computational impact may be small in comparison to increased accuracy it may provide. Thus, the set of processing nodes are arranged to insert the analytical gradient iteration. In an example, Adam is modified by the update vector to create the trained neural network. Here, Adam's general framework is used, however, the iterative gradient calculation of Adam is replaced by the random perturbation iteration described above. Where the analytical gradient iteration is used, Adam's standard gradient calculation is the analytical gradient every T iterations.

When the ANN 105 is trained, it may be used to classify data (e.g., produce the illustrated classifications 120), or perform other tasks accomplished by ANNs. By avoiding backpropagation, by reducing inter-processing node communication, and by using every iteration to optimize the ANN 105, the set of processing nodes may achieve fast, distributed, and accurate ANN training of a character not achievable via techniques in use today.

Although the description above accurately describes how the set of processing nodes achieves the ANN training technique, below are some additional details regarding the mathematical foundations that support the technique.

Overloading the computational graph of basic arithmetic operations to accommodate dual-valued arithmetic, the inner product $\nabla f(x_0)^T \vec{v}_1$ may be exactly computed by computing $\text{Im}(f(\vec{x}_0+\vec{v}_1\epsilon))$. Let $u \sim \mathcal{N}(0, h^2 I)$—an n-dimensional independent and identically distributed random Gaussian vector with variance $h^2$. Then:

$$\nabla f(x_0) = E\left[\frac{\text{Im}(f(x_0 + u\epsilon))}{h^2}u\right]$$

Thus, the gradient may be found by taking an expectation, which has the effect of taking an average of the normalized product of some realization u and the Im (imaginary dual component) of the function evaluated at a value perturbed by u along the dual component. While this may naturally lend itself to a Monte Carlo approach by passing many realizations of u into the function, along the dual component, Monte Carlo methods are known to only have convergence $$O\left(n^{\frac{1}{2}}\right),$$

which is far too slow for applications such as design optimization, AI, or computational biology, where forward evaluations of the model are computationally expensive.

The primary oversight in using a Monte Carlo approach to estimate the gradient is that, when realizations are averaged, information is discarded that is still usable to estimate the descent direction is discarded. Thus, by attempting to find a precise estimate of the gradient, "good enough" information, that is still usable for calculating a descent direction of the objective function, is lost. Dual Number Stochastic Gradient Descent (DN-SGD) addresses these issues.

The formula for the directional derivative of a function $f(\vec{x})$ in the direction of vector $\vec{v}$ is $$\nabla_{\vec{v}} f = \nabla f \cdot \frac{\vec{v}}{|\vec{v}|}.$$

Here, the numerator of the directional derivative is easily calculated by taking the dual component of $f(\vec{x}+\vec{v}\epsilon)$. The denominator is trivial to compute because it is just the 2-norm of $\vec{v}$. This understanding provides the basis for DN-SGD because the directional derivative of $-\nabla f$ along $\vec{u}$ is a valid descent direction, and therefore the objective function may be optimized by moving along a randomly chosen direction with a distance (e.g., magnitude) proportional to the directional derivative. While this is often a suboptimal descent direction, it is still a valid descent direction for the objective function, and is potentially very computationally efficient in contexts where forward solves of the objective function are less computationally expensive than gradient calculations. Accordingly, to form a DN-SGD parameter update, parameters are moved in the direction of $-\vec{u}$ by $\nabla_{\vec{u}} f$ to form a first order approximation. In an optimization context, the basic update formula for a parameter vector $\vec{\theta}$ is $$\theta_{k+1} = \theta_k - \text{Im}[f(\vec{\theta}_k + \vec{u}\epsilon)]\frac{\vec{u}}{|\vec{u}|^2}, \vec{u} \sim \mathcal{N}(0, h^2 I).$$

Figure 2:
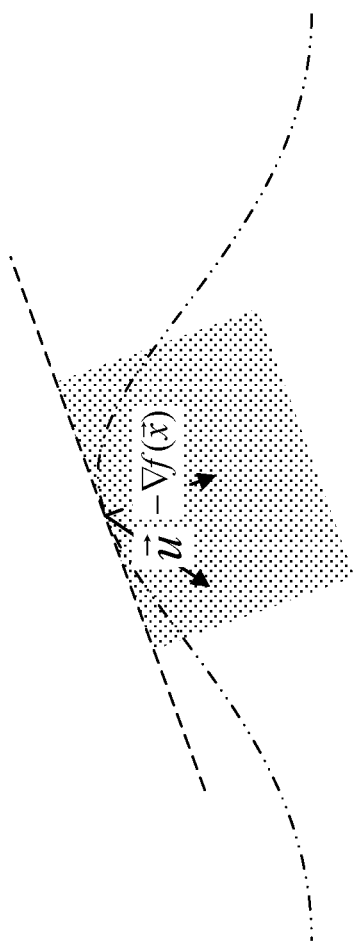
FIG. 2 illustrates an example of a perturbed parameter vector and a gradient, according to an embodiment.

FIG. 2 illustrates an example of a perturbed parameter vector $\vec{u}$ and a gradient $-\nabla f(\vec{x})$, according to an embodiment. Note that, although the gradient would be calculated by traditional training techniques, the perturbed parameter vector moves, at least in part, in the direction of the gradient. Thus, some portion of the perturbed parameter vector is useful for optimizing the objective function.

Figure 3:
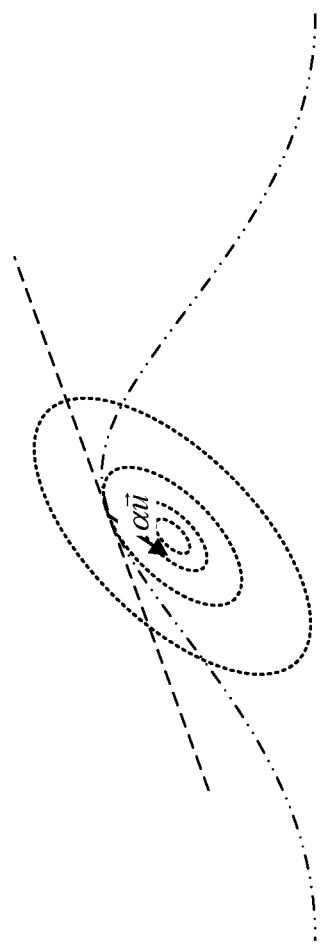
FIG. 3 illustrates an example of a perturbed parameter vector with calculate magnitude, according to an embodiment.

FIG. 3 illustrates an example of a perturbed parameter vector with calculate magnitude, according to an embodiment. The perturbed parameter vector of FIG. 2 is here modified by α in proportion to the degree that the perturbed parameter vector aligned with the gradient. This operates as a type of confidence score, whereby the greater the confidence (e.g., alignment between the two vectors), the more parameters are moved.

Figure 4:
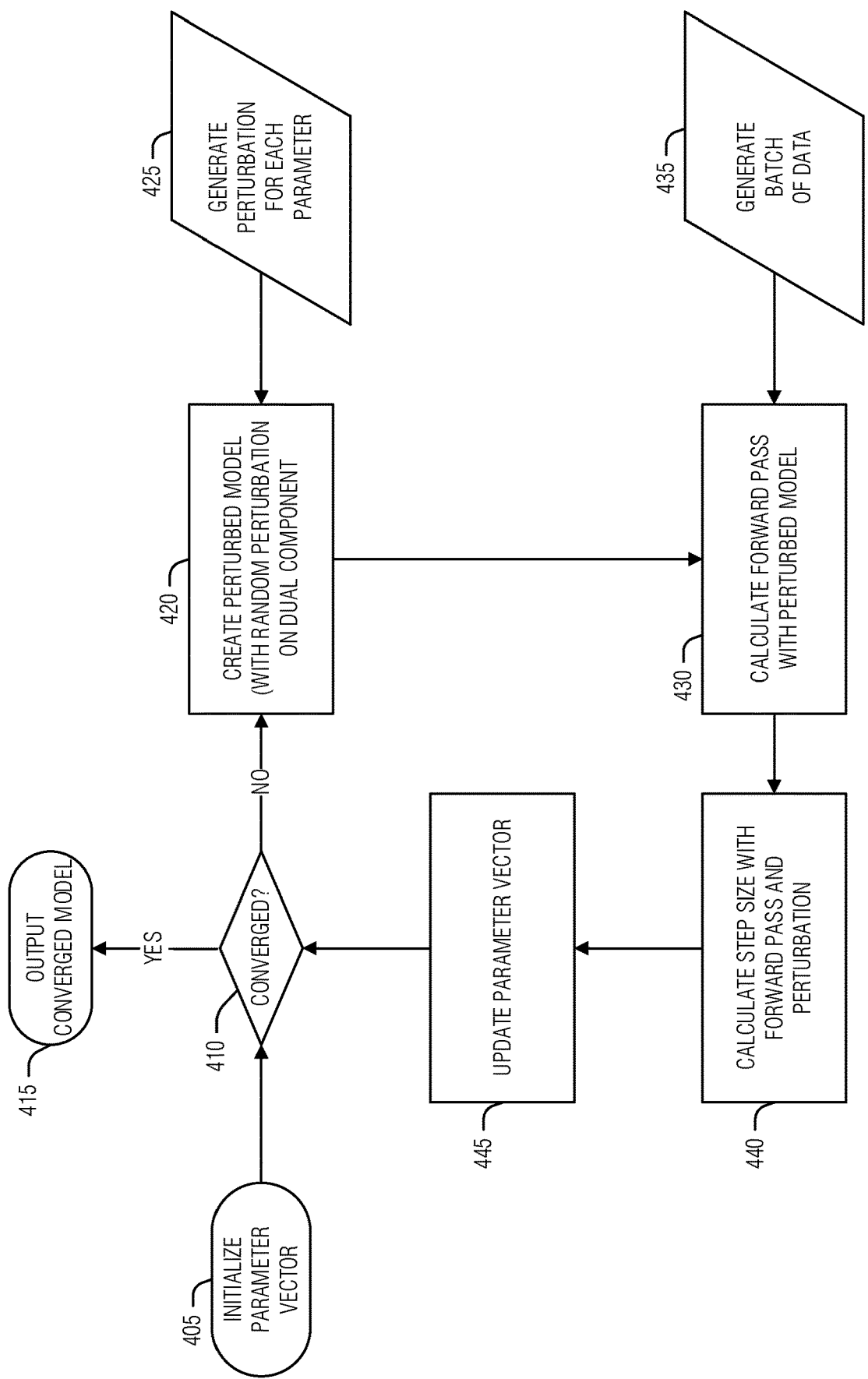
FIG. 4 illustrates an example flow to implement a dual number stochastic gradient descent (DN-SGD) technique, according to an embodiment.

FIG. 4 illustrates an example flow to implement DN-SGD, according to an embodiment. The following pseudocode illustrates the illustrated flow:

---
INITIALIZE: parameter vector θ
FOR: t = 1, . . . , $t_f$
   GENERATE: $\vec{u} \sim \mathcal{N}(0, h^2 I)$ CALCULATE: $\alpha \leftarrow \dfrac{\text{Im}(f(\theta + \vec{u}\epsilon))}{|\vec{u}|^2}$ UPDATE: θ = θ − α $\vec{u}$
   RETURN: θ
---

Where: θ is the parameter vector for the network; $\vec{u}$ is an independent and identically distributed Gaussian random vector; $f(\theta+\vec{u}\in)$ is computing the objective function with $\vec{u}$ as a perturbation placed along the dual component; $\text{Im}(f(\theta+\vec{u}\in))$ is the dual component of the objective function computed with the perturbation; α is the step size computed by dividing the dual component of the objective function computed with the perturbation by the magnitude squared of the perturbation vector; and The update to the parameter vector is performed in the last line.

In terms of the illustrated flow, a parameter vector is initialized (operation 405) and tested for convergence (decision 410). Whenever convergence is found, the flow ends by outputting the converged ANN (operation 415). Otherwise, the flow continues by creating a perturbed model (operation 420) using a randomly generated perturbation for each parameter (data 425). A forward pass of the model is calculated (operation 430) using a batch of training data (data 435). A step size is calculated by comparing the forward pass to the perturbed model (operation 440) and the parameters are updated with the result (e.g., parameters are moved in the direction of the random perturbation by the step size) (operation 445). The flows continue looping until the test for convergence (decision 410) passes.

Figure 5:
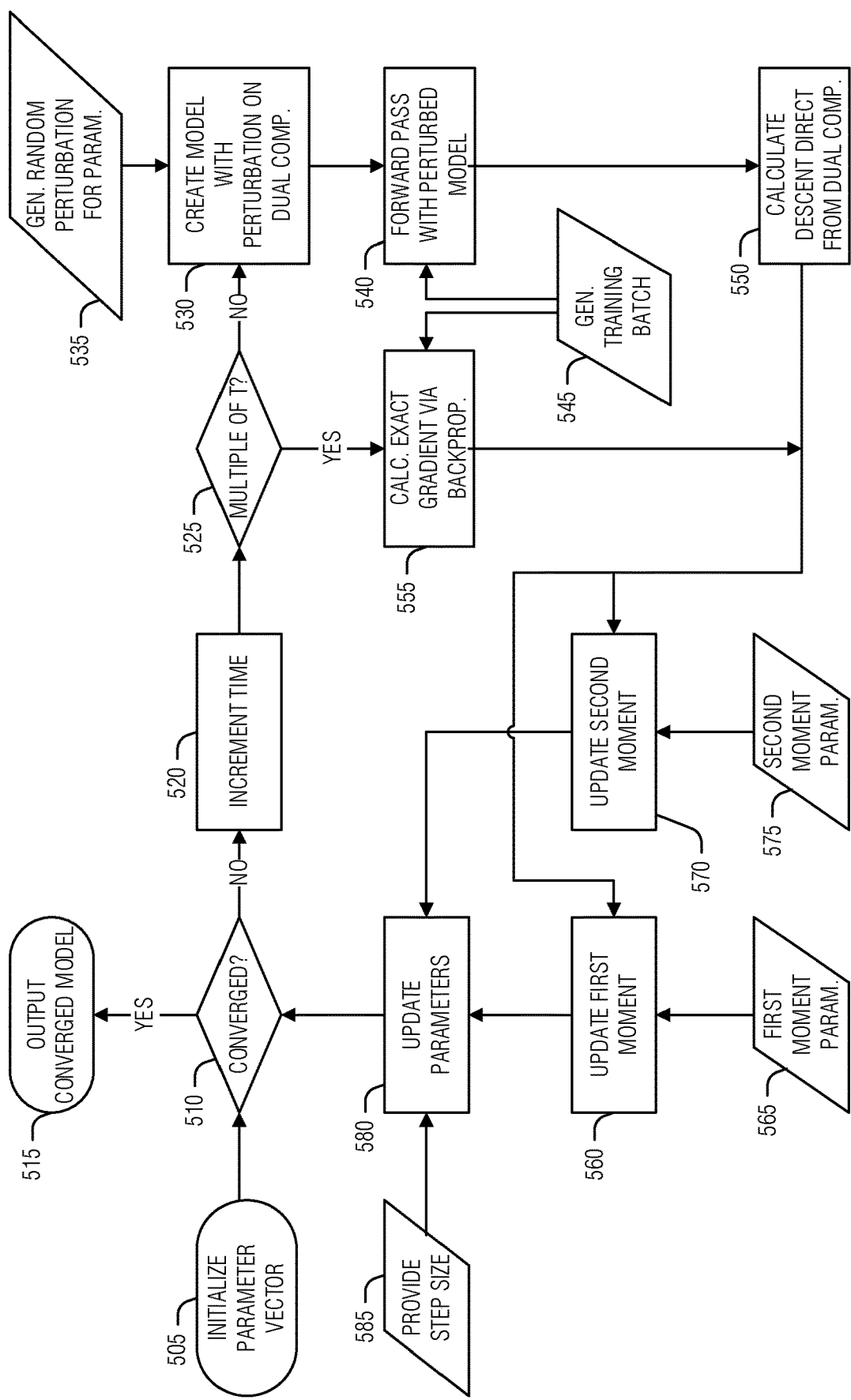
FIG. 5 illustrates an example flow to implement a dual number Adam-stochastic gradient descent (DN-ASGD) technique, according to an embodiment.

FIG. 5 illustrates an example flow to implement a dual number Adam-stochastic gradient descent (DN-ASGD) technique, according to an embodiment. This flow modifies the Adam technique to employ DN-SGD, instead of complete gradient calculations, in many iterations. This flow may be referred to as Dual Number Adam-SGD Hybrid Algorithm (DN-ASGD). Adam optimization attempts to combine the benefits of the AdaGrad and the Root Mean Square Propagation (RMSProp) algorithms, and has proven to be successful, including in AI and machine learning contexts. The primary technique behind Adam is the combination of Nesterov momentum with an adaptive learning rate. Nesterov momentum intuitively keeps the parameters moving in the direction of steepest descent even if the gradient is nearly flat at a given point or a training batch provides a poor estimate of the gradient. This property is useful when attempting to overcome saddle points in non-convex settings.

DN-ASGD performs Adam optimization, but uses the analytical (e.g., exact) gradient every T iterations of parameter updated and the dual number gradient estimate for all other updates. The advantage of the dual number gradient estimate is that it is significantly less computationally expensive to compute than the exact gradient, but it is often less accurate. To overcome this inaccuracy, the "if" block in the update loop of the pseudo code below computes the analytical gradient every T iterations. This provides a more exact gradient estimate and will help bias the momentum towards the correct descent direction.

---
INITIALIZE: parameter vector θ
REQUIRE: optimization parameters α, $\beta_1$, $\beta_2$, and T
INITIALIZE: $m_0 = 0$, $v_0 = 0$, and $t = 0$
FOR: t = 1, . . . , $t_f$:
   CALCULATE: t ← t + 1
   IF: mod (t, T) = 0:
     CALCULATE: $g_t \leftarrow \nabla f(\theta)$
   ELSE:

CALCULATE: $g_t \leftarrow \dfrac{\text{Im}(f(\theta+\vec{u}\epsilon))}{|\vec{u}|^2}$ CALCULATE: $m_t \leftarrow \beta_1 m_{t-1} + (1 - \beta_1) g_t$ CALCULATE: $v_t \leftarrow \beta_2 v_{t-1} + (1 - \beta_2) g_t^2$ CALCULATE: $\hat{m}_t \leftarrow \dfrac{m_t}{1 - \beta_1^t}$ CALCULATE: $\hat{v}_t \leftarrow \dfrac{v_t}{1 - \beta_2^t}$

CALCULATE:

$\theta \leftarrow \theta - \alpha \dfrac{\hat{m}_t}{\sqrt{\hat{v}} + \sqrt{\epsilon_{machine}}}$

RETURN: θ
---

Where: θ is the parameter vector for the network; α is the step size; $\beta_1$, $\beta_2$, are decay rates for the moment calculations; T sets how often to calculate the analytical gradient; $g_t$ is the calculated gradient at time t; $\vec{u}$ is an independent and identically distributed Gaussian random vector; $f(\theta+\vec{u}\in)$ is computing the objective function with $\vec{u}$ as a perturbation placed along the dual component; $\text{Im}(f(\theta+\vec{u}\in))$ is the dual component of the objective function computed with the perturbation; $m_t$ is the first moment at time t; $\hat{m}_t$ is the result of scaling the first moment at time t; $v_t$ is the second moment; $\hat{v}_t$ is the result of scaling the second moment at time t; $\epsilon_{machine}$ is machine precision; and The update to the parameter vector is performed in the last line The flow of FIG. 5 represents this integration of DN-SGD and Adam. The parameter vector is initialized (operation 505) and tested for convergence (decision 510). Upon convergence, the flow ends by producing a converged model (operation 515). Otherwise, the time increment T is incremented (e.g., increased by one) (operation 520) and a test as to whether a current iteration is a multiple of T is performed (decision 525). If this iteration is a multiple of T, then an analytical gradient will be calculated (operation 555). Otherwise, the DN-SGD gradient estimate of creating a perturbed model (operation 530) with random parameter perturbations (data 535), performing a forward pass on the perturbed model (operation 540) using training samples (data 545), and calculating the magnitude of the descent from the forward pass (operation 550) is completed.

The remaining operations follow Adam, whereby the first (operation 560) and second moment (operation 570) are updated respectively using the first moment parameters (data 565) and the second moment parameters (data 575). From here, the parameters are updated (operation 580) using the results of the first and second moment as well as a provided step size (data 585), and convergence is once again tested (decision 510).

Figure 6:
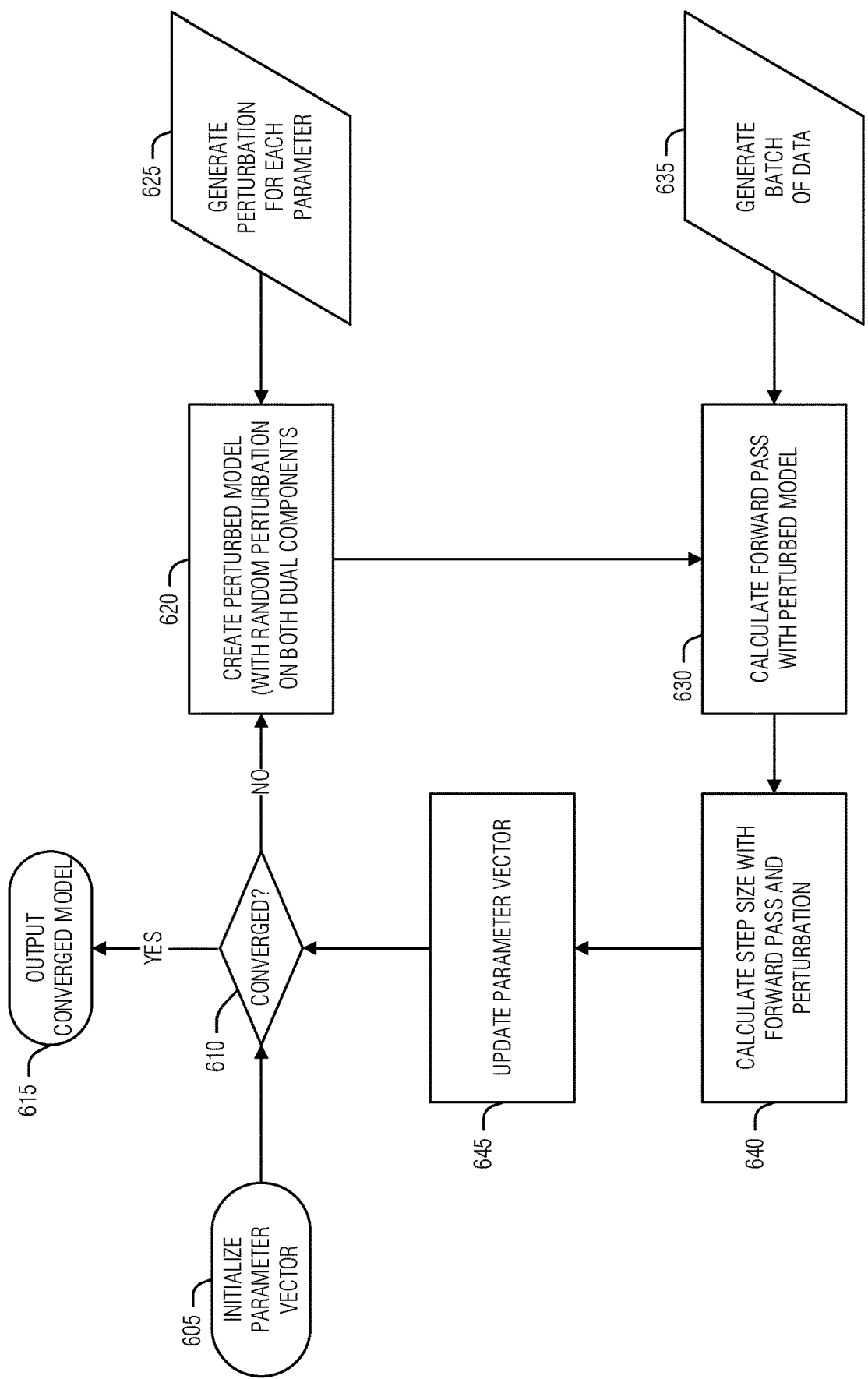
FIG. 6 illustrates an example flow to implement a hyper-dual number adaptive step-stochastic gradient descent (HD-ASGD) technique, according to an embodiment.

FIG. 6 illustrates an example flow to implement a hyper-dual number adaptive step-stochastic gradient descent (HD-ASGD) technique, according to an embodiment. In hyper-dual arithmetic, there are two dual components $\in_1$ and $\in_2$, which separately have the nilpotent property, and a third composite $\in_1\in_2$ component. A hyper-dual vector $\vec{x} \in \mathbb{HD}^n$ then has the form:

$$\vec{x} = \vec{x}_0 + \vec{x}_1\in_1 + \vec{x}_2\in_2 + \vec{x}_3\in_1\in_2, \text{ where } \vec{x}_0, \vec{x}_1, \vec{x}_2,$$
$$\vec{x}_3 \in \mathbb{R}^n$$

Following a similar process to that used above for dual numbers, a function $f: \mathbb{HD}^n \to \mathbb{HD}$ has the form:

$$f(\vec{x}) = f(\vec{x}_0) + \vec{x}_1^T \nabla f(\vec{x}_0)\in_1 + \vec{x}_2^T \nabla f(\vec{x}_0)\in_2 + (\vec{x}_3^T \nabla f(\vec{x}_0) + \vec{x}_1^T \nabla^2 f(\vec{x}_0)\vec{x}_2)\in_1\in_2$$

This property may be used to apply SGD to nonconvex optimization or very high dimensional contexts by noting, for the gradient descent parameter update formula $\vec{x}_{k+1} = \vec{x}_k - \alpha_k \vec{u}$, the optimal step size $\alpha_k$ for descent in direction $\vec{u}$ is given by $$\alpha_k = \frac{\nabla f(\vec{x}_k)^T \vec{u}}{\vec{u}^T \nabla^2 f(\vec{x}_k) \vec{u}},$$

and, the optimal descent direction is given by $\vec{u} = -\nabla f(\vec{x})$. While there exist many approximations to calculate this optimal step size without explicitly computing the Hessian matrix (e.g., via either adaptive step methods or quasi-Newton methods) or other line search methods to numerically calculate an optimal step, these methods are often inapplicable or inefficient in optimization contexts where forward solves of the model are prohibitively expensive. Furthermore, in high dimensional optimization problems storage of the Hessian (or approximate Hessian as in quasi-Newton methods) makes application of these methods impractical or unfeasible.

Hyper-dual arithmetic may be used to easily compute the optimal step size for a randomly chosen descent direction. As with the DN-SGD, a forward solve for $f(\vec{x}_k + \vec{u}\in_1 + \vec{u}\in_2)$ with $\vec{u} \sim \mathcal{N}(0, \sigma^2 I)$ is computed, the following being the result of the model output:

$$f(\vec{x}_k + \vec{u}\varepsilon_1 + \vec{u}\varepsilon_2) = f(\vec{x}_k) + \vec{u}^T \nabla f(\vec{x}_k)\varepsilon_1 + \vec{u}^T \nabla f(\vec{x}_k)\varepsilon_2 + \vec{u}^T \nabla^2 f(\vec{x}_k)\vec{u}\varepsilon_1\varepsilon_2$$

The optimal step size in direction $\vec{u}$ may be computed as:

$$\alpha_k = \frac{\text{Im}_1[f(\vec{x}_k + \vec{u}\epsilon_1 + \vec{u}\epsilon_2)]}{\text{Im}_3[f(\vec{x}_k + \vec{u}\epsilon_1 + \vec{u}\epsilon_2)]}$$

This result is used to implement HD-ASGD, which is similar to DN-SGD, but rather uses hyper-dual arithmetic to compute an adaptive step size. The performance difference between HD-ASGD and DN-SGD may be great, the former offering super linear convergence versus the linear convergence of the latter. DN-SGD computes first order information, whereas in HD-ASGD computes second order information and applies this to finding an optimal step size. First order information generally only offers linear convergence, whereas with second order information we may often obtain q-super linear convergence. Thus, HD-ASGD, and the corresponding hyper-dual arithmetic, offers a computationally efficient technique for obtaining second order information, and thereby accelerating the rate of convergence. The following pseudo code illustrates the iterative HD-ASGD:

---

INITIALIZE: parameter vector $\vec{\theta}$
FOR: = 1, . . . , $t_f$:
   GENERATE: $\vec{u} \sim \mathcal{N}(0, h^2 I)$

CALCULATE:

$$\alpha \leftarrow \frac{\text{Im}_1[f(\theta + \vec{u}\epsilon_1 + \vec{u}\epsilon_2)]}{\text{Im}_3[f(\theta + \vec{u}\epsilon_1 + \vec{u}\epsilon_2)]}$$

CALCULATE: $\theta \leftarrow \theta - \alpha \vec{u}$
RETURN: $\theta$

---

Where: $\theta$ is the parameter vector for the network; $\alpha$ is the step size to be calculated; $\vec{u}$ is an independent and identically distributed Gaussian random vector; and the update to the parameter vector is performed in the last line.

In terms of the illustrated flow, a parameter vector is initialized (operation 605) and tested for convergence (decision 610). Whenever convergence is found, the flow ends by outputting the converged ANN (operation 615). Otherwise, the flow continues by creating a perturbed model, with perturbations on both dual components $\in_1$ and $\in_2$ (operation 620), using a randomly generated perturbation for each parameter (data 625). A forward pass of the model is calculated (operation 630) using a batch of training data (data 635). A step size is calculated by comparing the forward pass to the perturbed model (operation 640) and the parameters are updated with the result (e.g., parameters are moved in the direction of the random perturbation by the step size) (operation 645). The flows continue looping until the test for convergence (decision 610) passes.

Implementing the dual number and hyper-dual number arithmetic, used above, may be accomplished by overloading basic arithmetic functions, direct all subroutines to these overloaded functions, and leave the remainder of the real-valued code mostly unchanged. This permits most AI software to be efficiently modified to use DN-SGD and HD-ASGD. A potential drawback to employing algorithmic differentiation via hyper-dual arithmetic—e.g., as compared to numerical or analytical computation of the derivatives with real-valued arithmetic—is the increased computational load associated with higher dimensional algebraic operations. Hyper-dual arithmetic may use nine times more floating point operations per arithmetic step than real-valued arithmetic. However, for $f(\vec{x}+\vec{u}\in_1+\vec{u}\in_2)$, there is symmetry in the dual terms $f(\vec{x}+\vec{u}\in_1+\vec{u}\in_2)=f(\vec{x})+\vec{u}^T\nabla f(\vec{x})\in_1+\vec{u}^T\nabla f(\vec{x})\in_2+\vec{u}^T\nabla^2 f(\vec{x})\ \vec{u}\in_1\in_2$. The $\in_1$ and $\in_2$ components are equal by the axioms of hyper-dual arithmetic. This observation enables omission (e.g., disregarding) the redundant calculation for the second dual component, reducing worst-case computational load of hyper-dual arithmetic to be five times that for real-valued arithmetic.

Figure 7:
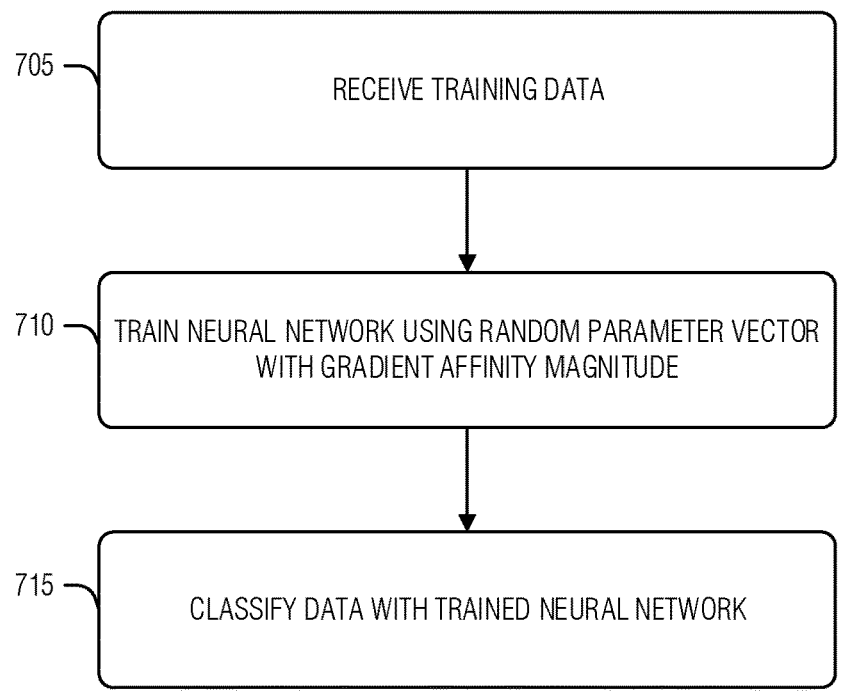
FIG. 7 illustrates a flow diagram of an example of a method for neural network training, according to an embodiment.

FIG. 7 illustrates a flow diagram of an example of a method 700 for neural network training, according to an embodiment. The operations of the method 700 are implemented in electronic hardware, such as that described above or below (e.g., processing circuitry).

At operation 705, a training set for a neural network is received. Here, the neural network includes a set of nodes arranged in layers and a set of inter-node weights between nodes in the set of nodes. In an example, the training set is a subset of a complete training set.

At operation 710, the neural network is iteratively trained to create a trained neural network. In an example, each iteration of training the neural network is performed independently between layers of the neural network. In an example, different layers of the neural network are trained on different hardware. In an example, each iteration of the training is performed independently between nodes in the set of nodes. In an example, nodes of the neural network are trained on different hardware.

In an example, an iteration of the training includes generating a random unit vector. In an example, the random unit vector is calculated as $\vec{u}=\sim\mathcal{N}(0, h^2 I)$, where $\vec{u}$ is the random unit vector and $\mathcal{N}(0, h^2 I)$ is an n-dimensional random Gaussian vector with variance $h^2$. In an example, a seed used to generate the random unit vector is communicated to the different hardware when the neural network layers are trained on the different hardware.

An iteration of the training also includes creating an update vector by calculating a magnitude for the random unit vector based on a degree that the random unit vector coincides with an estimated gradient between a member of the training set and an objective function for the neural network, the gradient represented by a dual number. In an example, the magnitude for the random unit vector is calculated as $$\alpha \leftarrow \frac{\text{Im}(f(\theta+\vec{u}\epsilon))}{|\vec{u}|^2},$$

where $\alpha$ is the magnitude, $\theta$ is the parameter vector, and $$\frac{\text{Im}(f(\theta+\vec{u}\epsilon))}{|\vec{u}|^2}$$

is the dual number representation of the estimated gradient.

In an example, the dual number is a hyper-dual number. Here, the magnitude for the random unit vector is calculated as:

$$\alpha \leftarrow \frac{\text{Im}_1[f(\theta+\vec{u}\epsilon_1+\vec{u}\epsilon_2)]}{\text{Im}_3[f(\theta+\vec{u}\epsilon_1+\vec{u}\epsilon_2)]},$$

where $\alpha$ is the magnitude, $\theta$ is the parameter vector, and $$\frac{\text{Im}_1[f(\theta+\vec{u}\epsilon_1+\vec{u}\epsilon_2)]}{\text{Im}_3[f(\theta+\vec{u}\epsilon_1+\vec{u}\epsilon_2)]}$$

is the hyper-dual number representation of the estimated gradient.

In an example, the estimated gradient is specific to the training set and different than a second estimated gradient for a different subset of the complete training set.

An iteration of the training also includes updating a parameter vector for an inter-node weight by subtracting the update vector from a previous parameter vector of the inter-node weight. In an example, to update the parameter vector the following calculation is used: $\theta_{new}=\theta_{last}-\alpha\vec{u}$, where $\theta_{new}$ is the updated parameter vector, and $\theta_{last}$ is the previous parameter vector.

In an example, the iterations include an analytical gradient iteration. Here, the analytical gradient iteration occurs every T iterations of the iterations. In an example, Adaptive Moment Estimation (Adam) is modified by the update vector to create the trained neural network.

At operation 715, data is classified using the trained neural network.

Figure 8:
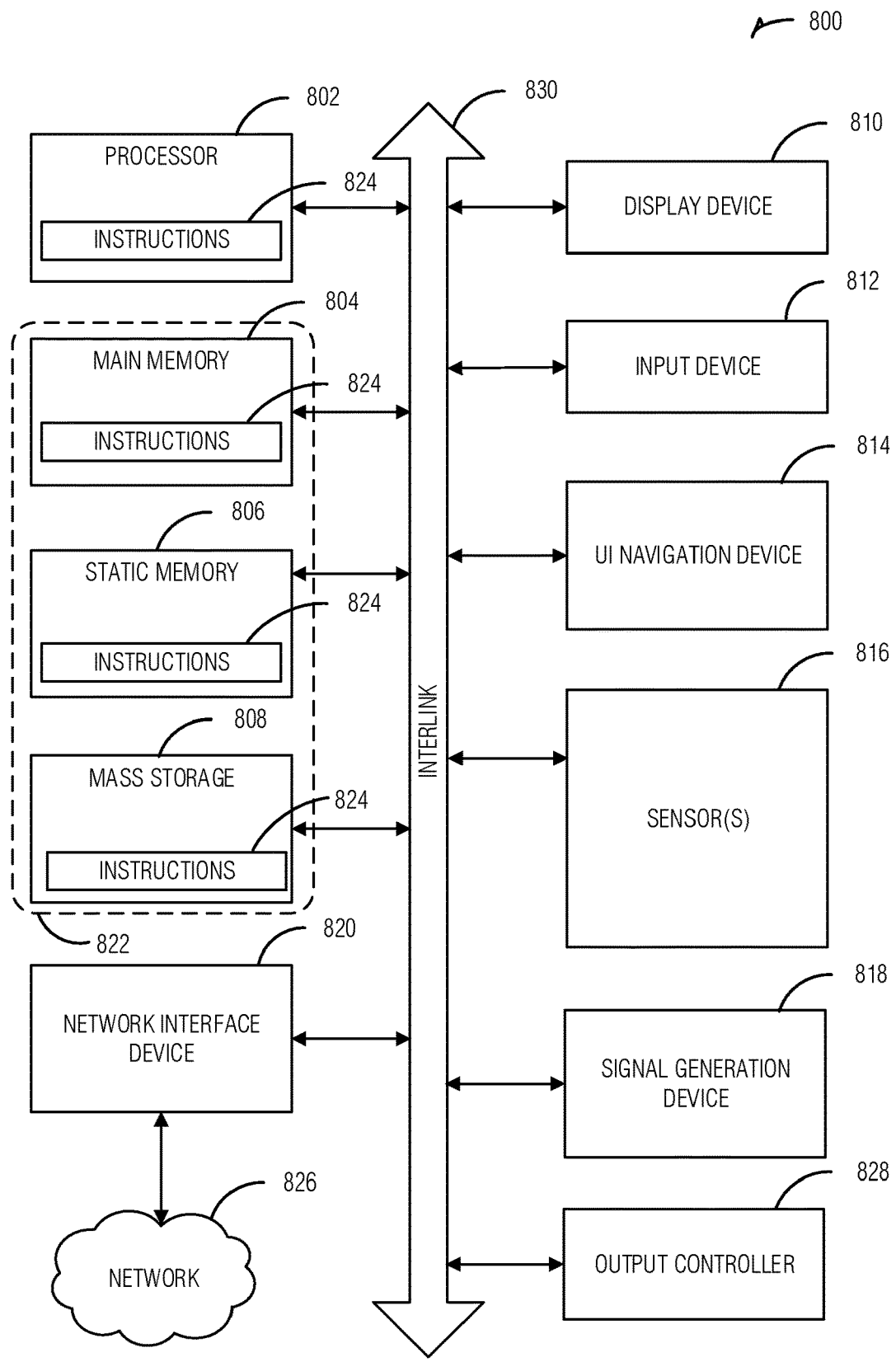
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a device for neural network training, the device comprising: an interface to receive a training set for a neural network, the neural network comprising a set of nodes arranged in layers and a set of inter-node weights between nodes in the set of nodes; a set of processing nodes to train the neural network to create a trained neural network via iterations, an iteration in the iterations including: generation of a random unit vector; creation of an update vector by calculating a magnitude for the random unit vector based on a degree that the random unit vector coincides with an estimated gradient between a member of the training set and an objective function for the neural network, the gradient represented by a dual number; and update of a parameter vector for an inter-node weight by subtracting the update vector from a previous parameter vector of the inter-node weight.

In Example 2, the subject matter of Example 1 includes, wherein the generation of the random unit vector includes calculation of $\vec{u} = \sim \mathcal{N}(0, h^2 I)$, where $\vec{u}$ is the random unit vector and $\mathcal{N}(O, h^2 I)$ is an n-dimensional random Gaussian vector with variance $h^2$.

In Example 3, the subject matter of Examples 1-2 includes, wherein the calculation of the magnitude for the random unit vector includes calculation of $$\alpha \leftarrow \frac{\text{Im}(f(\theta + \vec{u}\epsilon))}{|\vec{u}|^2},$$

where $\alpha$ is the magnitude, $\theta$ is the parameter vector, and $$\frac{\text{Im}(f(\theta + \vec{u}\epsilon))}{|\vec{u}|^2}$$

is the dual number representation of the estimated gradient.

In Example 4, the subject matter of Example 3 includes, wherein the update of the parameter vector includes calculation of $\theta_{new} = \theta_{last} - \alpha \vec{u}$, wherein $\theta_{new}$ is the updated parameter vector, and $\theta_{last}$ is the previous parameter vector.

In Example 5, the subject matter of Examples 1-4 includes, wherein each iteration of training the neural network is performed independently between layers of the neural network.

In Example 6, the subject matter of Example 5 includes, wherein different layers of the neural network are trained on different hardware of the set of processing nodes.

In Example 7, the subject matter of Example 6 includes, wherein a seed used to generate the random unit vector is communicated to the different hardware of the set of processing nodes.

In Example 8, the subject matter of Examples 5-7 includes, wherein each iteration of training the neural network is performed independently between nodes in the set of nodes.

In Example 9, the subject matter of Example 8 includes, wherein nodes of the neural network are trained on different hardware of the set of processing nodes.

In Example 10, the subject matter of Examples 1-9 includes, wherein the iterations include an analytical gradient iteration, the analytical gradient iteration occurring every T iterations of the iterations.

In Example 11, the subject matter of Example 10 includes, wherein Adaptive Moment Estimation (Adam) is modified by the update vector to create the trained neural network.

In Example 12, the subject matter of Examples 1-11 includes, wherein the dual number is a hyper-dual number, and wherein the calculation of the magnitude for the random unit vector includes calculation of $\alpha \leftarrow$ $$\frac{\text{Im}_1[f(\vec{x_k} + \vec{u}\epsilon_1 + \vec{u}\epsilon_2)]}{\text{Im}_3[f(\vec{x_k} + \vec{u}\epsilon_1 + \vec{u}\epsilon_2)]},$$

where $\alpha$ is the magnitude, $\theta$ is the parameter vector, and $$\frac{\text{Im}_1[f(\vec{x_k} + \vec{u}\epsilon_1 + \vec{u}\epsilon_2)]}{\text{Im}_3[f(\vec{x_k} + \vec{u}\epsilon_1 + \vec{u}\epsilon_2)]}$$

is the hyper-dual number representation of the estimated gradient.

In Example 13, the subject matter of Examples 1-12 includes, wherein the training set is a subset of a complete training set.

In Example 14, the subject matter of Example 13 includes, wherein the estimated gradient is specific to the training set and is different than a second estimated gradient for a different subset of the complete training set.

Example 15 is a method for neural network training, the method comprising: receiving a training set for a neural network, the neural network comprising a set of nodes arranged in layers and a set of inter-node weights between nodes in the set of nodes; training the neural network, to create a trained neural network, via iterations, an iteration in the iterations including: generating a random unit vector; creating an update vector by calculating a magnitude for the random unit vector based on a degree that the random unit vector coincides with an estimated gradient between a member of the training set and an objective function for the neural network, the gradient represented by a dual number; and updating a parameter vector for an inter-node weight by subtracting the update vector from a previous parameter vector of the inter-node weight; and classifying data using the trained neural network.

In Example 16, the subject matter of Example 15 includes, wherein generating the random unit vector includes calculating $\vec{u} = \sim \mathcal{N}(0, h^2 I)$, where $\vec{u}$ is the random unit vector and $\mathcal{N}(0, h^2 I)$ is an n-dimensional random Gaussian vector with variance $h^2$.

In Example 17, the subject matter of Examples 15-16 includes, wherein calculating the magnitude for the random unit vector includes calculating $$\alpha \leftarrow \frac{\text{Im}(f(\theta + \vec{u}\epsilon))}{|\vec{u}|^2},$$

where $\alpha$ is the magnitude, $\theta$ is the parameter vector, and $$\frac{\text{Im}(f(\theta + \vec{u}\epsilon))}{|\vec{u}|^2},$$

is the dual number representation of the estimated gradient.

In Example 18, the subject matter of Example 17 includes, wherein updating the parameter vector includes calculating $\theta_{new} = \theta_{last} - \alpha \vec{u}$, wherein $\theta_{new}$ is the updated parameter vector, and $\theta_{last}$ is the previous parameter vector.

In Example 19, the subject matter of Examples 15-18 includes, wherein each iteration of training the neural network is performed independently between layers of the neural network.

In Example 20, the subject matter of Example 19 includes, wherein different layers of the neural network are trained on different hardware.

In Example 21, the subject matter of Example 20 includes, wherein a seed used to generate the random unit vector is communicated to the different hardware.

In Example 22, the subject matter of Examples 19-21 includes, wherein each iteration of training the neural network is performed independently between nodes in the set of nodes.

In Example 23, the subject matter of Example 22 includes, wherein nodes of the neural network are trained on different hardware.

In Example 24, the subject matter of Examples 15-23 includes, wherein the iterations include an analytical gradient iteration, the analytical gradient iteration occurring every T iterations of the iterations.

In Example 25, the subject matter of Example 24 includes, wherein Adaptive Moment Estimation (Adam) is modified by the update vector to create the trained neural network.

In Example 26, the subject matter of Examples 15-25 includes, wherein the dual number is a hyper-dual number, and wherein calculating the magnitude for the random unit vector includes calculating $$\alpha \leftarrow \frac{\text{Im}_1[f(\vec{x_k} + \vec{u}\epsilon_1 + \vec{u}\epsilon_2)]}{\text{Im}_3[f(\vec{x_k} + \vec{u}\epsilon_1 + \vec{u}\epsilon_2)]},$$

where $\alpha$ is the magnitude, $\theta$ is the parameter vector, and $$\frac{\text{Im}_1[f(\vec{x_k} + \vec{u}\epsilon_1 + \vec{u}\epsilon_2)]}{\text{Im}_3[f(\vec{x_k} + \vec{u}\epsilon_1 + \vec{u}\epsilon_2)]}$$

is the hyper-dual number representation of the estimated gradient.

In Example 27, the subject matter of Examples 15-26 includes, wherein the training set is a subset of a complete training set.

In Example 28, the subject matter of Example 27 includes, wherein the estimated gradient is specific to the training set and is different than a second estimated gradient for a different subset of the complete training set.

Example 29 is at least one machine readable medium including instructions that, when executed by processing circuitry, cause the processing circuitry to perform any method of Examples 15-28.

Example 30 is a system comprising means to perform any method of Examples 15-28.

Example 31 is at least one machine readable medium including instructions that, when executed by processing circuitry, cause the processing circuitry to perform operations comprising: receiving a training set for a neural network, the neural network comprising a set of nodes arranged in layers and a set of inter-node weights between nodes in the set of nodes; training the neural network, to create a trained neural network, via iterations, an iteration in the iterations including: generating a random unit vector; creating an update vector by calculating a magnitude for the random unit vector based on a degree that the random unit vector coincides with an estimated gradient between a member of the training set and an objective function for the neural network, the gradient represented by a dual number; and updating a parameter vector for an inter-node weight by subtracting the update vector from a previous parameter vector of the inter-node weight; and classifying data using the trained neural network.

In Example 32, the subject matter of Example 31 includes, wherein generating the random unit vector includes calculating $\vec{u} = \sim \mathcal{N}(0, h^2 I)$, where $\vec{u}$ is the random unit vector and $\mathcal{N}(0, h^2 I)$ is an n-dimensional random Gaussian vector with variance $h^2$.

In Example 33, the subject matter of Examples 31-32 includes, wherein calculating the magnitude for the random unit vector includes calculating $$\alpha \leftarrow \frac{\text{Im}(f(\theta + \vec{u}\epsilon))}{|\vec{u}|^2},$$

where $\alpha$ is the magnitude, $\theta$ is the parameter vector, and $$\frac{\text{Im}(f(\theta + \vec{u}\epsilon))}{|\vec{u}|^2}$$

is the dual number representation of the estimated gradient.

In Example 34, the subject matter of Example 33 includes, wherein updating the parameter vector includes calculating $\theta_{new} = \theta_{last} - \alpha \vec{u}$, wherein $\theta_{new}$ is the updated parameter vector, and $\theta_{last}$ is the previous parameter vector.

In Example 35, the subject matter of Examples 31-34 includes, wherein each iteration of training the neural network is performed independently between layers of the neural network.

In Example 36, the subject matter of Example 35 includes, wherein different layers of the neural network are trained on different hardware.

In Example 37, the subject matter of Example 36 includes, wherein a seed used to generate the random unit vector is communicated to the different hardware.

In Example 38, the subject matter of Examples 35-37 includes, wherein each iteration of training the neural network is performed independently between nodes in the set of nodes.

In Example 39, the subject matter of Example 38 includes, wherein nodes of the neural network are trained on different hardware.

In Example 40, the subject matter of Examples 31-39 includes, wherein the iterations include an analytical gradient iteration, the analytical gradient iteration occurring every T iterations of the iterations.

In Example 41, the subject matter of Example 40 includes, wherein Adaptive Moment Estimation (Adam) is modified by the update vector to create the trained neural network.

In Example 42, the subject matter of Examples 31-41 includes, wherein the dual number is a hyper-dual number, and wherein calculating the magnitude for the random unit vector includes calculating $$\alpha \leftarrow \frac{\text{Im}_1[f(\vec{x_k} + \vec{u}\epsilon_1 + \vec{u}\epsilon_2)]}{\text{Im}_3[f(\vec{x_k} + \vec{u}\epsilon_1 + \vec{u}\epsilon_2)]},$$

where $\alpha$ is the magnitude, $\theta$ is the parameter vector, and $$\frac{\text{Im}_1[f(\vec{x_k} + \vec{u}\epsilon_1 + \vec{u}\epsilon_2)]}{\text{Im}_3[f(\vec{x_k} + \vec{u}\epsilon_1 + \vec{u}\epsilon_2)]}$$

is the hyper-dual number representation of the estimated gradient.

In Example 43, the subject matter of Examples 31-42 includes, wherein the training set is a subset of a complete training set.

In Example 44, the subject matter of Example 43 includes, wherein the estimated gradient is specific to the training set and is different than a second estimated gradient for a different subset of the complete training set.

Example 45 is a system for neural network training, the system comprising: means for receiving a training set for a neural network, the neural network comprising a set of nodes arranged in layers and a set of inter-node weights between nodes in the set of nodes; means for training the neural network, to create a trained neural network, via iterations, an iteration in the iterations including: generating a random unit vector; creating an update vector by calculating a magnitude for the random unit vector based on a degree that the random unit vector coincides with an estimated gradient between a member of the training set and an objective function for the neural network, the gradient represented by a dual number; and updating a parameter vector for an inter-node weight by subtracting the update vector from a previous parameter vector of the inter-node weight; and means for classifying data using the trained neural network.

In Example 46, the subject matter of Example 45 includes, wherein generating the random unit vector includes calculating $\vec{u} = \sim \mathcal{N}(0, h^2 I)$, where $\vec{u}$ is the random unit vector and $\mathcal{N}(0, h^2 I)$ is an n-dimensional random Gaussian vector with variance $h^2$.

In Example 47, the subject matter of Examples 45-46 includes, wherein calculating the magnitude for the random unit vector includes calculating $$\alpha \leftarrow \frac{\text{Im}(f(\theta + \vec{u}\epsilon))}{|\vec{u}|^2},$$

where $\alpha$ is the magnitude, $\theta$ is the parameter vector, and $$\frac{\text{Im}(f(\theta + \vec{u}\epsilon))}{|\vec{u}|^2}$$

is the dual number representation of the estimated gradient.

In Example 48, the subject matter of Example 47 includes, wherein updating the parameter vector includes calculating $\theta_{new} = \theta_{last} - \alpha \vec{u}$, wherein $\theta_{new}$ is the updated parameter vector, and $\theta_{last}$ is the previous parameter vector.

In Example 49, the subject matter of Examples 45-48 includes, wherein each iteration of training the neural network is performed independently between layers of the neural network.

In Example 50, the subject matter of Example 49 includes, wherein different layers of the neural network are trained on different hardware.

In Example 51, the subject matter of Example 50 includes, wherein a seed used to generate the random unit vector is communicated to the different hardware.

In Example 52, the subject matter of Examples 49-51 includes, wherein each iteration of training the neural network is performed independently between nodes in the set of nodes.

In Example 53, the subject matter of Example 52 includes, wherein nodes of the neural network are trained on different hardware.

In Example 54, the subject matter of Examples 45-53 includes, wherein the iterations include an analytical gradient iteration, the analytical gradient iteration occurring every T iterations of the iterations.

In Example 55, the subject matter of Example 54 includes, wherein Adaptive Moment Estimation (Adam) is modified by the update vector to create the trained neural network.

In Example 56, the subject matter of Examples 45-55 includes, wherein the dual number is a hyper-dual number, and wherein calculating the magnitude for the random unit vector includes calculating $$\alpha \leftarrow \frac{\text{Im}_1 \ [f(\vec{x_k} + \vec{u}\epsilon_1 + \vec{u}\epsilon_2)]}{\text{Im}_3 \ [f(\vec{x_k} + \vec{u}\epsilon_1 + \vec{u}\epsilon_2)]},$$

where $\alpha$ is the magnitude, $\theta$ is the parameter vector, and $$\frac{\text{Im}_1 \ [f(\vec{x_k} + \vec{u}\epsilon_1 + \vec{u}\epsilon_2)]}{\text{Im}_3 \ [f(\vec{x_k} + \vec{u}\epsilon_1 + \vec{u}\epsilon_2)]}$$

is the hyper-dual number representation of the estimated gradient.

In Example 57, the subject matter of Examples 45-56 includes, wherein the training set is a subset of a complete training set.

In Example 58, the subject matter of Example 57 includes, wherein the estimated gradient is specific to the training set and is different than a second estimated gradient for a different subset of the complete training set.

Example 59 is at least one machine-readable medium including instructions that, when executed by processing circuitry, cause the processing circuitry to perform operations to implement of any of Examples 1-58.

Example 60 is an apparatus comprising means to implement of any of Examples 1-58.

Example 61 is a system to implement of any of Examples 1-58.

Example 62 is a method to implement of any of Examples 1-58.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for neural network training, the device comprising:
    an interface to receive a training set for a neural network, the neural network comprising a set of nodes arranged in layers and a set of inter-node weights between nodes in the set of nodes; and
    a set of hardware processing nodes to train the neural network to create a trained neural network via iterations at each of the hardware processing nodes, an iteration in the iterations performed on each of the hardware processing nodes, the iteration including:
        generation of a random unit vector, wherein the generation of the random unit vector includes calculation of $\vec{u} = \sim \mathcal{N}(0, h^2 I)$, where $\vec{u}$ is the random unit vector and $\mathcal{N}(0, h^2 I)$ is an n-dimensional random Gaussian vector with variance $h^2$, and I is the n-dimensional identity matrix;
        creation of an update vector by calculating a magnitude for the random unit vector based on a degree that the random unit vector coincides with an estimated gradient between a member of the training set and an objective function for the neural network, the estimated gradient represented by a dual number; and
        update of a parameter vector for an inter-node weight by subtracting the update vector from a previous parameter vector of the inter-node weight.

2. The device of claim 1, wherein the calculation of the magnitude for the random unit vector includes calculation of $$\alpha \leftarrow \frac{\text{Im}(f(\theta + \vec{u}\varepsilon))}{|\vec{u}|^2},$$

where $\alpha$ is the magnitude, $\theta$ is the parameter vector, and $$\frac{\text{Im}(f(\theta + \vec{u}\varepsilon))}{|\vec{u}|^2}$$

is the dual number representation of the estimated gradient with $\in$ having the property that $\in^2 = 0$.

3. The device of claim 2, wherein the update of the parameter vector includes calculation of $\theta_{new} = \theta_{last} - \alpha \vec{u}$, wherein $\theta_{new}$ is the updated parameter vector, and $\theta_{last}$ is the previous parameter vector.

4. The device of claim 1, wherein the iterations include an analytical gradient iteration, the analytical gradient iteration occurring every T iterations of the iterations.

5. The device of claim 4, wherein Adaptive Moment Estimation (Adam) is modified by the update vector to create the trained neural network.

6. The device of claim 1, wherein the dual number is a hyper-dual number, and wherein the calculation of the magnitude for the random unit vector includes calculation of $$\alpha \leftarrow \frac{\text{Im}_1 [f(\vec{x_k} + \vec{u}\varepsilon_1 + \vec{u}\varepsilon_2)]}{\text{Im}_3 [f(\vec{x_k} + \vec{u}\varepsilon_1 + \vec{u}\varepsilon_2)]},$$

where $\alpha$ is the magnitude, $\vec{x_k}$ is the parameter vector, and $$\frac{\text{Im}_1 [f(\vec{x_k} + \vec{u}\varepsilon_1 + \vec{u}\varepsilon_2)]}{\text{Im}_3 [f(\vec{x_k} + \vec{u}\varepsilon_1 + \vec{u}\varepsilon_2)]}$$

is the hyper-dual number representation of the estimated gradient.

7. The device of claim 1, wherein the training set is a subset of a complete training set.

8. The device of claim 1, wherein each iteration of training the neural network is performed independently between layers of the neural network, wherein different layers of the neural network are trained on different hardware of the set of processing nodes, and wherein each iteration of training the neural network is performed independently between nodes in the set of nodes.

9. A method for neural network training, the method comprising:
    receiving a training set for a neural network, the neural network comprising a set of nodes arranged in layers and a set of inter-node weights between nodes in the set of nodes; and
    training the neural network, to create a trained neural network, via iterations at each hardware processing node of a set of hardware processing nodes, an iteration in the iterations including:

generating a random unit vector including calculating $\vec{u}=\sim\mathcal{N}(0,h^2 I)$, where $\vec{u}$ is the random unit vector and $\mathcal{N}(0, h^2 I)$ is an n-dimensional random Gaussian vector with variance $h^2$, and I is the n-dimensional identity matrix;

creating an update vector by calculating a magnitude for the random unit vector based on a degree that the random unit vector coincides with an estimated gradient between a member of the training set and an objective function for the neural network, the estimated gradient represented by a dual number; and updating a parameter vector for an inter-node weight by subtracting the update vector from a previous parameter vector of the inter-node weight; and classifying data using the trained neural network.

10. The method of claim 9, wherein calculating the magnitude for the random unit vector includes calculating $$\alpha \leftarrow \frac{\text{Im}(f(\theta + \vec{u}\varepsilon))}{|\vec{u}|^2},$$

where $\alpha$ is the magnitude, $\theta$ is the parameter vector, and $$\frac{\text{Im}(f(\theta + \vec{u}\varepsilon))}{|\vec{u}|^2}$$

is the dual number representation of the estimated gradient with $\in$ having the property that $\in^2=0$.

11. The method of claim 10, wherein updating the parameter vector includes calculating $\theta_{new}=\theta_{last}-\alpha\vec{u}$, wherein $\theta_{new}$ is the updated parameter vector, and $\theta_{last}$ is the previous parameter vector.

12. The method of claim 9, wherein the iterations include an analytical gradient iteration, the analytical gradient iteration occurring every T iterations of the iterations.

13. The method of claim 12, wherein Adaptive Moment Estimation (Adam) is modified by the update vector to create the trained neural network.

14. The method of claim 9, wherein the dual number is a hyper-dual number, and wherein calculating the magnitude for the random unit vector includes calculating $$\alpha \leftarrow \frac{\text{Im}_1 [f(\vec{x_k} + \vec{u}\varepsilon_1 + \vec{u}\varepsilon_2)]}{\text{Im}_3 [f(\vec{x_k} + \vec{u}\varepsilon_1 + \vec{u}\varepsilon_2)]},$$

where $\alpha$ is the magnitude, $\vec{x_k}$ is the parameter vector, and $$\frac{\text{Im}_1 [f(\vec{x_k} + \vec{u}\varepsilon_1 + \vec{u}\varepsilon_2)]}{\text{Im}_3 [f(\vec{x_k} + \vec{u}\varepsilon_1 + \vec{u}\varepsilon_2)]}$$

is the hyper-dual number representation of the estimated gradient.

15. The method of claim 9, wherein the training set is a subset of a complete training set.

16. The method of claim 9, wherein each iteration of training the neural network is performed independently between layers of the neural network, wherein different layers of the neural network are trained on different hardware of the set of processing nodes, and wherein each iteration of training the neural network is performed independently between nodes in the set of nodes.

17. At least one non-transitory machine readable medium including instructions that, when executed by processing circuitry, cause the processing circuitry to perform operations comprising:

receiving a training set for a neural network, the neural network comprising a set of nodes arranged in layers and a set of inter-node weights between nodes in the set of nodes; and training the neural network, to create a trained neural network, via iterations at each hardware processing node of a set of hardware processing nodes, an iteration in the iterations including:

generating a random unit vector including calculating $\vec{u}=\sim\mathcal{N}(0, h^2 I)$, where $\vec{u}$ is the random unit vector and $\mathcal{N}(0, h^2 I)$ is an n-dimensional random Gaussian vector with variance $h^2$, and I is the n-dimensional identity matrix;

creating an update vector by calculating a magnitude for the random unit vector based on a degree that the random unit vector coincides with an estimated gradient between a member of the training set and an objective function for the neural network, the estimated gradient represented by a dual number; and updating a parameter vector for an inter-node weight by subtracting the update vector from a previous parameter vector of the inter-node weight; and classifying data using the trained neural network.

18. The at least one non-transitory machine readable medium of claim claim 17, wherein calculating the magnitude for the random unit vector includes calculating $\alpha \leftarrow$ $$\alpha \leftarrow \frac{\text{Im}(f(\theta + \vec{u}\varepsilon))}{|\vec{u}|^2},$$

where $\alpha$ is the magnitude, $\theta$ is the parameter vector, and $$\frac{\text{Im}(f(\theta + \vec{u}\varepsilon))}{|\vec{u}|^2}$$

is the dual number representation of the estimated gradient with $\in$ having the property that $\in^2=0$.

19. The at least one non-transitory machine readable medium of claim 18, wherein updating the parameter vector includes calculating $\theta_{new}=\theta_{last}-\alpha\vec{u}$, wherein $\theta_{new}$ is the updated parameter vector, and $\theta_{last}$ is the previous parameter vector.

20. The at least one non-transitory machine readable medium of claim 17, wherein the iterations include an analytical gradient iteration, the analytical gradient iteration occurring every T iterations of the iterations.

21. The at least one non-transitory machine readable medium of claim 20, wherein Adaptive Moment Estimation (Adam) is modified by the update vector to create the trained neural network.

22. The at least one non-transitory machine readable medium of claim 17, wherein the dual number is a hyper-dual number, and wherein calculating the magnitude for the random unit vector includes calculating $$\alpha \leftarrow \frac{\mathrm{Im}_1\ [f(\vec{x_k} + \vec{u}\varepsilon_1 + \vec{u}\varepsilon_2)]}{\mathrm{Im}_3\ [f(\vec{x_k} + \vec{u}\varepsilon_1 + \vec{u}\varepsilon_2)]},$$

where $\alpha$ is the magnitude, $\vec{x}_k$ is the parameter vector, and $$\frac{\mathrm{Im}_1\ [f(\vec{x_k} + \vec{u}\varepsilon_1 + \vec{u}\varepsilon_2)]}{\mathrm{Im}_3\ [f(\vec{x_k} + \vec{u}\varepsilon_1 + \vec{u}\varepsilon_2)]}$$

is the hyper-dual number representation of the estimated gradient.

23. The at least one non-transitory machine readable medium of claim 17, wherein the training set is a subset of a complete training set.

24. The at least one non-transitory machine readable medium of claim 17, wherein each iteration of training the neural network is performed independently between layers of the neural network, wherein different layers of the neural network are trained on different hardware of the set of processing nodes, and wherein each iteration of training the neural network is performed independently between nodes in the set of nodes.

\* \* \* \* \*